United States Patent [19]

Trumbull

[11] Patent Number: 5,199,875
[45] Date of Patent: Apr. 6, 1993

[54] METHOD AND APPARATUS FOR GENERATING SUPPLEMENTAL MOTION IN A SIMULATOR

[75] Inventor: Douglas Trumbull, Southfield, Mass.

[73] Assignee: Ridefilm Corporation, Housatonic, Mass.

[21] Appl. No.: 626,828

[22] Filed: Dec. 13, 1990

[51] Int. Cl.$^5$ .............................................. G09B 9/00
[52] U.S. Cl. ........................................ 434/62; 434/58
[58] Field of Search ................. 434/62, 29, 55, 30–35, 434/40, 58, 45, 44, 43; 272/16–18, 1 C, 28 R, 29; 273/85 R, 85 A, 85 B, 85 C, 85 D; 352/85; 472/1–3, 28–34, 57, 59, 60, 61

[56] References Cited

U.S. PATENT DOCUMENTS

| | | | |
|---|---|---|---|
| 3,597,857 | 8/1971 | Akister et al. | 434/58 |
| 4,034,484 | 7/1977 | Radice . | |
| 4,066,256 | 1/1978 | Trumball | 272/18 |
| 4,576,577 | 3/1986 | Lam et al. | 434/58 |

Primary Examiner—Richard J. Apley
Assistant Examiner—Glenn E. Richman
Attorney, Agent, or Firm—McCormick, Paulding & Huber

[57] ABSTRACT

A simulator system for use in providing an event simulation to occupants includes a motion base moveable along displacement axes by means of displaceable actuators. Feedback sensors provide signals indicative of the measured displacement of a corresponding actuator. An audio-visual display mechanism is included for providing a sequence of audio and visual images to the occupants. A motion base controller receives the feedback sensor signals and generates actuator drive signals below a cutoff frequency in response to received command signals. A system controller provides the command signals to the motion base controller in synchronization with the presentation of the audio-visual images to the occupants. A mechanism is included for generating supplemental actuator drive signals that have frequencies above the cutoff frequency. A drive signal summing apparatus serially configured with the motion base controller and the actuators receives the actuator drive signals and sums therewith the supplemental actuator drive signals before presentation to the actuators.

23 Claims, 4 Drawing Sheets

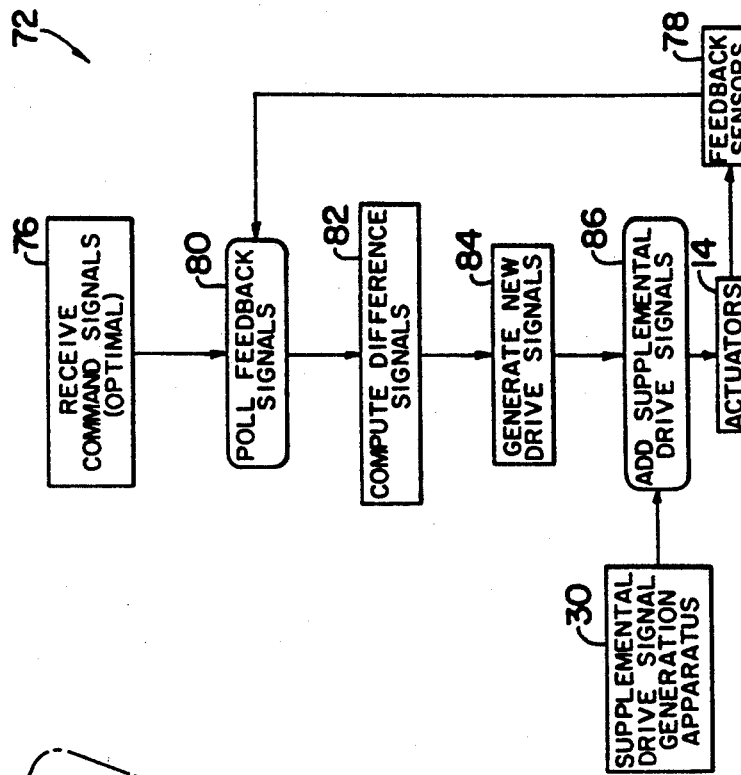
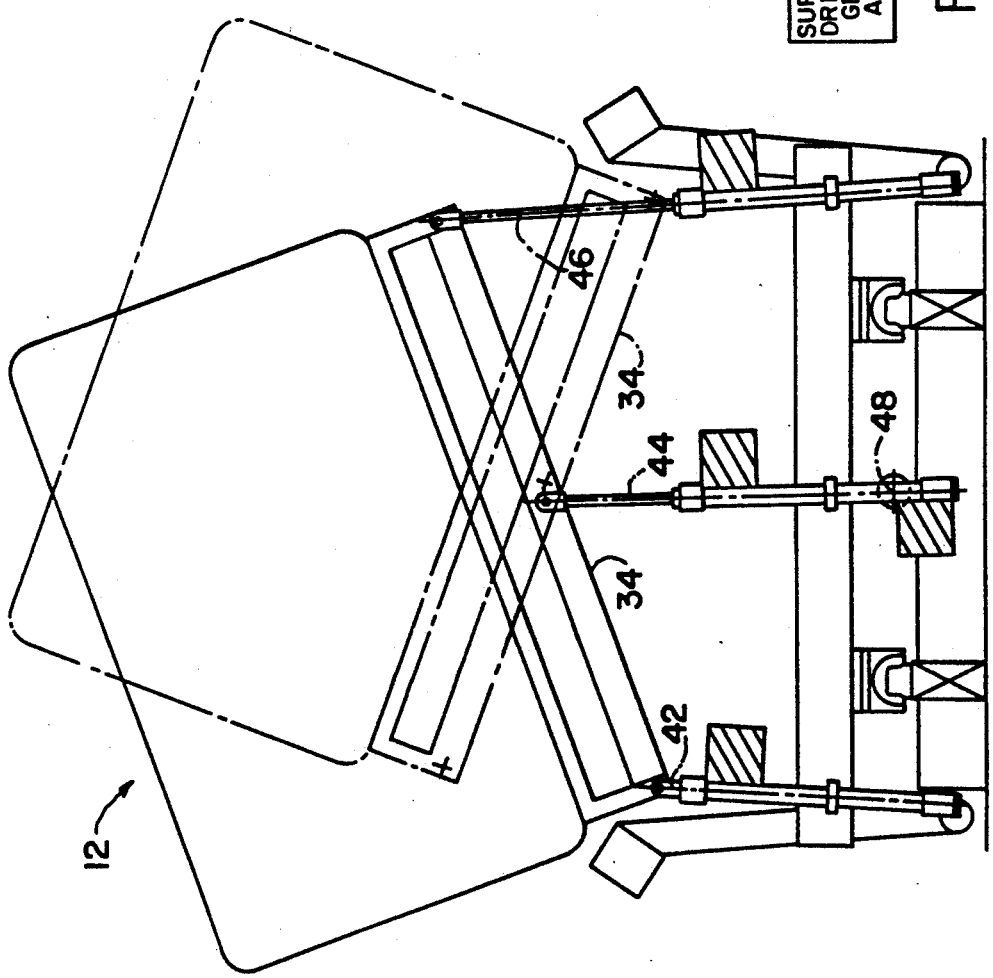

METHOD AND APPARATUS FOR GENERATING SUPPLEMENTAL MOTION IN A SIMULATOR

TECHNICAL FIELD

The present invention relates to simulators generally and in particular to a method and apparatus for providing supplemental sensory input to occupants of a simulator, thereby enhancing realism.

BACKGROUND OF THE INVENTION

Simulators are well known in the art having found applications in such diverse fields as aircraft pilot training and amusement rides. In general, known simulators include a motion base having one or more seats and a plurality of programmable actuators which displace the motion base from a rest position in accordance with a predetermined sequence of drive signals. Synchronized to the motion base movement is a motion picture illuminated on a projection screen directly attached to the motion base or in the immediate environment. A controller is sometimes included to provide for synchronization between the motion base displacements and the accompanying audio-visual work. Alternatively, the audio-visual images and motion base control signals are simultaneously recorded in media if, for example, the resultant program is to be repeatably used.

Known simulators include the amusement ride apparatus disclosed in U.S. Pat. Nos. 4,752,065 and 4,798,376 which includes a motion base that moves and tilts passengers viewing a motion picture. A plurality of passenger holding frames is provided which are all synchronously moved by separate sets of actuators. A film is shown to passengers on a stationary screen. The passenger holding frames are each pivoted up and down on a beam which is supported only by two largely vertical actuators while two pairs of links or arms limit the movement of the beam.

Another amusement ride is disclosed in U.S. Pat. No. 4,066,256. The '256 amusement ride creates the illusion that the passengers are seated in a rapidly maneuvering vehicle by applying forces to the passengers in synchronism with the display of a motion picture image. The '256 apparatus includes a passenger holding frame that has three locations resting on hydraulic rams that can tilt the frame or move it up and down with a film projector and viewing screen connected to the frame to move with it.

U.S. Pat. No. 4,846,686 discloses a motor vehicle simulator with multiple images. The '686 simulator is characterized by a conventional front looking "driver point of view" image which would be seen by a driver looking through a windshield. Another section of the images displayed with the '686 simulator includes images that were recorded by one or more cameras which were facing rearward. An individual in the simulator is simultaneously presented with a forward looking "driver point of view" image and with other images representing what would be seen by the driver looking towards the rear of the simulator vehicle.

U.S. Pat. No. 4,276,030 discloses a pivotable vehicle simulator with one end of an upper frame carrying an occupant station of a simulated vehicle. The upper frame is mounted to a base frame which is pivotal about a vertical axis. A dummy steering wheel is provided at the occupant's station and is linked to pivot the upper frame. Combined rotary and translation bearings support the other end of the upper frame on a shaft carried on a base frame to accommodate the pivotal movement about the vertical axis and also to provide a small upward pitching of the upper frame during pivoting of the upper frame in either direction from a central position so that gravity acts to restore the upper frame and steering wheel to centered conditions.

None of the prior art simulators provide sufficient tactile feel to be realistic. Occupants of the simulators are always cognizant that they are in a simulator as opposed to a moving vehicle. Lack of realism is objectionable in an amusement ride as well as in an airplane or motor vehicle type instructional simulators. It would be desirable to have a simulator which generates a more realistic simulation of an event in a simple and cost efficient manner. The present invention is drawn towards such a simulator.

SUMMARY OF THE INVENTION

An object of the present invention is to provide a simulator system whose realism is enhanced by a method and apparatus that generates supplemental motion within a select frequency range.

According to the present invention a simulator system for use in providing an event simulation to occupants thereof includes a motion base moveable along a plurality of displacement axes that has displaceable actuators for moving the motion base along the axes in accordance with received drive signals. Feedback sensors are configured with each of the actuators for providing signals indicative of the measured displacement of the corresponding actuator. An audio-visual display mechanism is included for providing a sequence of audio and visual images to the simulator system occupants. A motion base controller receives the feedback sensor signals and generates actuator drive signals below a cutoff frequency in response to received command signals. A system controller is included for providing the command signals to the motion base controller in synchronization with the presentation of the audio-visual images to the occupants. The simulator system also includes a mechanism for generating supplemental actuator drive signals that have frequencies above said cutoff frequency. A drive signal summing apparatus serially configured with the motion base controller and the actuators receives the actuator drive signals and sums therewith the supplemental actuator drive signals before presentation to the actuators.

BRIEF DESCRIPTION OF THE DRAWINGS

FIG. 3 is a simplified illustration of an alternative view of the motion base of FIG. 2.

FIG. 5 is a diagrammatic illustration of an algorithm executed by the simulator system of FIG. 1.

DESCRIPTION OF THE PREFERRED EMBODIMENT

Figure 1:
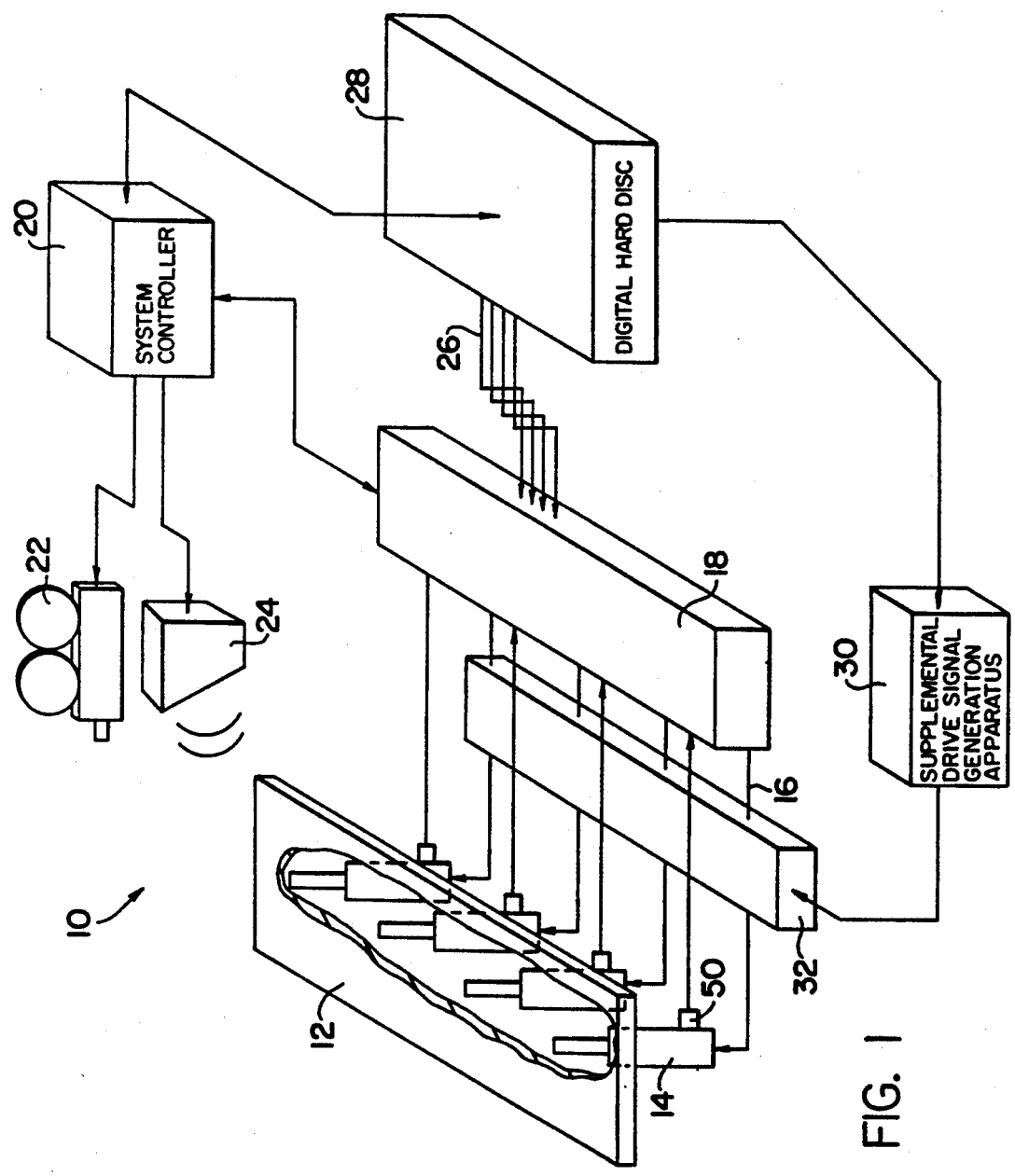
FIG. 1 is a simplified block diagram illustrating a simulator system provided according to the present invention.

Referring now to FIG. 1 there is shown a block diagram illustrating a simulator system 10 provided according to the present invention. The system 10 comprises a motion base 12 which includes a plurality of actuators 14. As detailed hereinafter with respect to FIGS. 2 and 3, the motion base includes a plurality of seats for the simulator occupants. The actuators are of a known hydraulic type and receive drive signals on lines 16 from a hydraulic controller 18.

The simulator system includes a system controller 20 that provides control signals to an audio-visual system indicated schematically by projector 22 and speaker 24 as well as a screen (not shown). Typically, the audio-visual images are encoded in a single film medium in a known manner. In the preferred embodiment, the "Ommnimax" film format of the Imax Systems, Corp. is used. Command signals are provided on lines 26 from a storage medium such as a digital hard disc 28 to the motion base controller. The actuator drive signals are programmed in a manner detailed hereinafter and are configured to be synchronously applied to the motion base in accordance with the preprogrammed audio-visual images. In an important point of departure of the present invention over the prior art, supplemental actuator drive signals are provided by a supplemental drive signal generation apparatus 30 to a summing mechanism 32.

Figure 2:
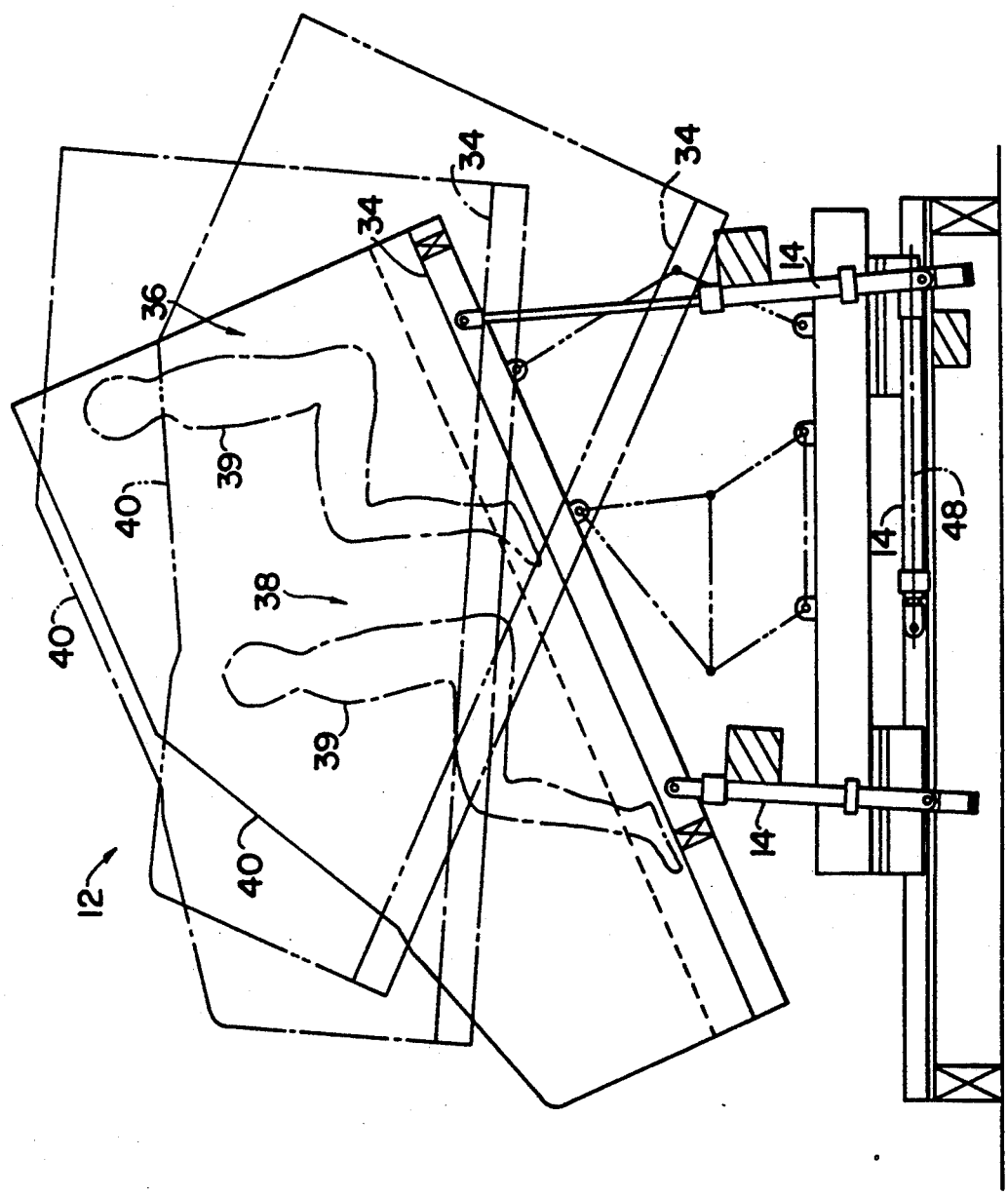
FIG. 2 is a simplified illustration of a motion base included in the simulator system of FIG. 1.

FIGS. 2 and 3 are simplified schematic illustrations of the motion base provided according to the present invention. It is of a known type such as is marketed by the Intamin Corporation Inc., of Berkeley, Calif. As noted above, the motion base is comprised of a plurality of hydraulic actuators each of which is respectively configured with a servo valve (not shown) for receiving drive signals to displace the actuators a selected amount and at a selected rate. Both the hydraulic actuators and the servo valves are of a known type. A platform 34 receives a plurality of seats in rows 36 and 38. In the preferred embodiment the seating device is in the form of a vehicle in which the occupants 39 sit and look outwardly through a "windshield" 40 to view a motion picture. The motion base actuators are configured along four axes, with three vertical axes 42, 44 and 46 to provide pitch and roll as well as one axis 48 perpendicular to the others to provide fore-aft motion. The preferred Intamin motion base is substantial, having an approximate weight of three tons and capable of acceleration in the neighborhood of three quarters of a "g" (i.e., 7.5 m/sec$^2$)". Various positions of the motion base are shown in phantom.

The motion base controller is of a known type such as marketed by the Allen Bradley Corporation. The motion base controller generates hydraulic drive signals in response to command signals received from an external source such as the hard disc recorder in the preferred embodiment. The motion base is operated in closed loop fashion, with each actuator having a sensor 50 for generating feedback signals corresponding to the measured actuator displacement. These feedback signals are used by the motion base controller to insure that, during operation, there is a one inch maximum error range between the commanded position of the actuator and its actual displacement. The controller is of a known configuration and is preferably a proportional/integral/derivative (PID) type controller. A value of 6 hertz has been selected as the drive signal frequency upper bound as a safety feature to prevent that controller from attempting to operate the motion base in a manner which could cause unintended oscillations. The motion base controller therefore will not pass any signals to the motion base above this frequency.

For a given set of audio-visual images or motion picture in the preferred embodiment, a corresponding sequence of command signals must be generated for the motion base controller in repetitive programming situations, such as in an amusement ride. Typically the command signals for the motion base controller are programmed using an Anitech motion controller manufactured by the Anitech Corporation. This controller comprises algorithms which allow for manual selection of individual actuator displacements synchronized with corresponding segments of the motion picture. In addition, algorithms such as executed by PCFX software provided by the Persistence of Vision Company, Culver City, Calif. are used to provide for specific desired transient responses of the motion base. The PCFX program or its equivalent provides for enhanced editing capabilities as well as command signal generation utilities for sine wave generation, actuator displacement smoothing and key frame splicing.

The four axis motion base must have each actuator position programmed synchronized with the audio-visual images being presented to the occupants at a particular time. Synchronization can be accomplished in any of a number of known ways. In the preferred embodiment, the SMPTE time code is provided to the system controller from the motion picture and is provided to controller software such as is available from the above referenced Anitech Corporation and auxiliary control apparatus such as a Studio 3 sequence and a MacIntosh brand computer or equivalent. Software associated with the system controller synchronizes the command signals with the associated motion picture frame(s) as detailed hereafter. The synchronized command signals are then preferably stored in the digital hard disc. The system controller also comprises software of a known type to enable synchronized playback of the command signals with the presentation of the motion picture to the occupants of the simulator system.

Figure 4:
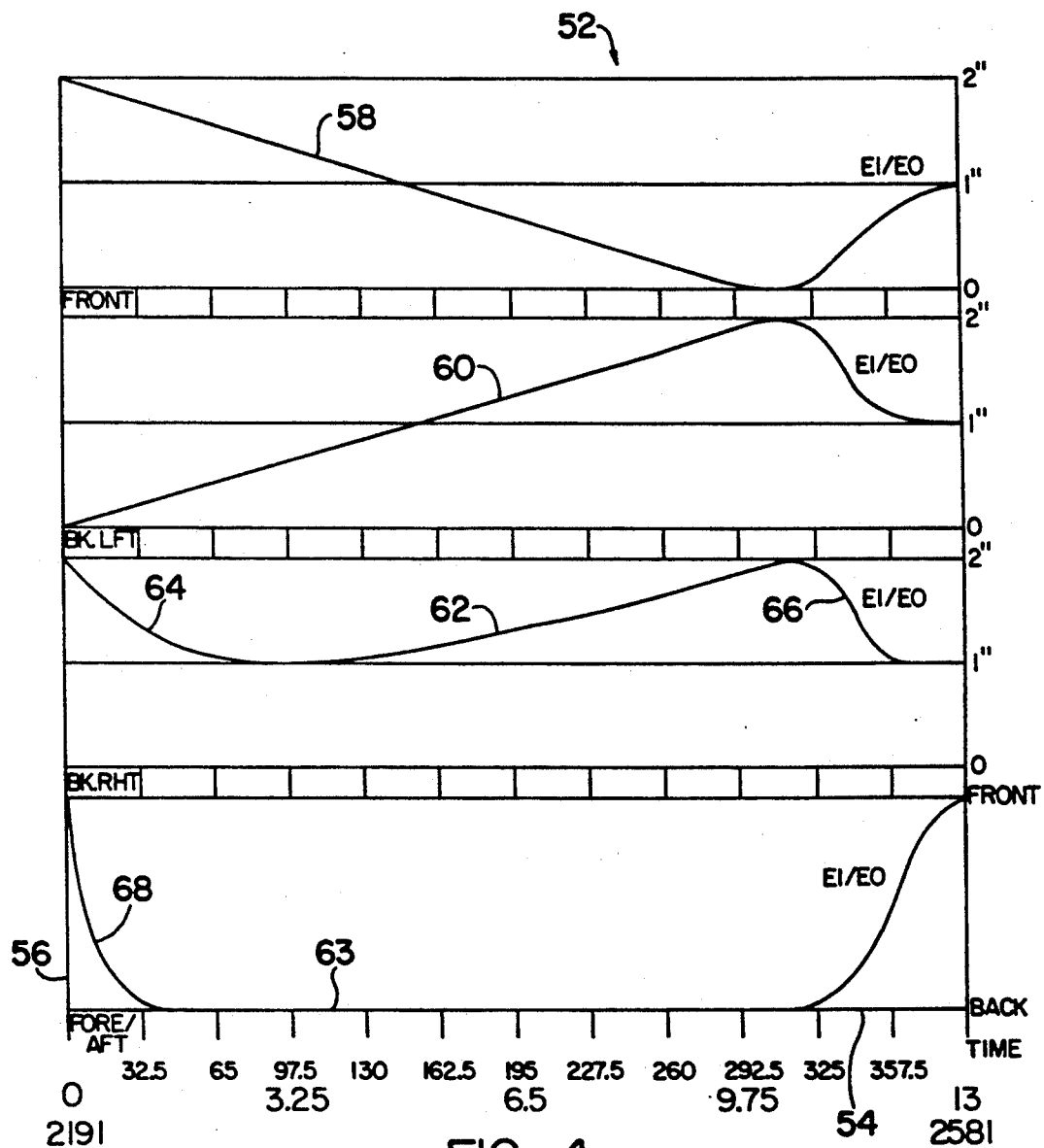
FIG. 4 is a simplified diagrammatic illustration showing the programming of the motion base of FIGS. 2 and 3.

An example of the aforementioned motion base command signal generation and synchronization can be seen by reference to FIG. 4 in which there is illustrated a portion of a moveplot 52 generated in accordance with the present invention. The moveplot 52 displays the displacement of the individual actuators as a function of time and frame sequence for a selected portion of the command signal sequence and correspondingly for a segment of the film. Axis 54 displays time and frame sequence increasing from left to right, and the displacement of each individual actuator is sequentially displayed along axis 56. Each actuator plot is configured in registration with the other. The desired position then is programmed into the controller varying from zero displacement to full extension, approximately 22 inches overall. In the moveplot 52, curves 58, 60, 62 and 63 correspond to the actuator displacement versus time curves for the actuators of FIG. 1. Note that curve portions 64, 66 and 68 are configured in accordance with the desired effect on the occupants. For minimum acceleration the command signal sequence is selected to approximate a Gaussian function. Similarly, other mathematical algorithms can be used to generate maximum acceleration. In the system 10 this is accomplished using the PCFX program noted above. The speed of displacement of the actuator is programmed in view of the motion base controller cutoff frequency.

As noted above, prior art simulators all display a lack of realism, regardless of the application. In contrast the present invention is characterized by the supplemental drive signal generation apparatus which provides for enhanced realism. It was the present inventor who first realized that the lack of realism in the prior art simulators stemmed from a total absence of sensory input to the occupants in the frequency range between 6 and 250 Hertz.

The motion picture shown to the occupants of the simulator apparatus contain a visual and an audio component. Typically however, the audio speakers which are included have a frequency response which substantially rolls off the amplitude of those frequencies below 1000 Hz., especially below 250 Hz. The motion base controller provides drive signals that physically move the motion base at frequencies less than 6 Hz., leaving the sensory input to the simulator occupants with a broad deadband. It is the present inventor who first recognized that providing sensory input in this missing frequency range is essential to enhanced realism. Although shown separately in FIG. 1, the supplemental drive signals can be stored after generation in a memory associated with the system controller for subsequent synchronized playback with the motion picture.

The present invention provides for supplemental drive signals to be summed with the actuator drive signals at the summing apparatus comprised of conventional components needed to electrically sum the drive signals presented thereto, with drive signals from both drive signal sources given equal weighting. The presentation of supplemental drive signals as provided by the assignee of the present invention is referred to by its trademark "high frequency injection". The supplemental drive signals are characterized by a frequency spectrum primarily between 2 and 250 Hz., well above the cutoff frequency of the motion base controller. The supplemental drive signals can comprise simple waveforms such as sine or square waves as provided by a frequency generator or more complex waveforms as, for example, a running automobile engine recorded by a digital audio tape (DAT) recorder.

Those skilled in the art will note that simply extending the frequency response of the audio speakers down below 250 Hz. does not suffice. This is because in many environments, such as that of an automobile, sensory input is as much "felt" as "heard". Compare, for example, "hearing" an automobile engine versus "feeling" that same engine via the automobile seats and other interior components. The difference in perception between these two forms of sensory input has a physical basis. It is important to note that sound comprises only the compression-rarefaction of acoustic waves. This is due to the fact that the vibrations from a speaker are transmitted across a fluid (air). It is well known that fluid media can only support acoustic wave propagation.

In contrast, vibrations "felt" through automobile components, to continue with the example. Such vibrations are more complex and comprise elastic waves (shear plus acoustic waves and combinations thereof), since elastic wave propagation is possible in a solid medium such as the automobile seats, steering wheel, etc. Note further that, while it is theoretically possible to excite a fuller spectrum of sensory signals in a simulator by generating sound at very low frequencies, the amount of power required for the same would both be uneconomically large and unpleasant to experience. Regardless, the overall effect would not be any more "realistic" than when these low frequencies are not present.

The present invention efficiently transduces signals in this preferred frequency range and unexpectedly provides the benefits noted above. The conventional wisdom incorrectly presumes that the frequency response characteristics of the motion base would so severely roll off input signals above 6 Hz. as to render the drive signals above this value nonexistent at best. Note that supplemental drive signals which are simple audio recordings of phenomena are sufficient to generate the complex vibrations in the simulator since these signals are being provided to one or more of the actuators each of which is positioned at a different motion axis. Therefore, it is possible to record the sound of an automobile engine or an object sliding on a rock face and these signals can be injected at an appropriate time into the actuator drive signals to create a number of different subtle tactile sensations.

FIG. 5 illustrates a simplified algorithm 72 executed by the present invention. Regardless of what kind of motion base controller provides the drive signals, one channel of drive signal voltage is provided to a servo valve on each axis which controls the amount of hydraulic pressure exerted by each actuator. These drive signals correspond to optimal actuator displacements as determined by the command signals (block 76). At periodic sample points, commonly one per frame or 30 per second in the present system, the motion base controller polls (block 78) the associated feedback signal (block 80) to determine the current displacement of that actuator. These signals are then compared to the commanded actuator displacement signals at block 80 and a difference is calculated (block 82). The result is either positive or negative and the actuator is then either extended or compressed in an effort to make the calculated error zero in response to new drive signals (block 84).

In this feedback type controller the hardware is always seeking optimal position for the actuators. Due to its closed loop nature, there are limits to the controller response time, resulting in a low maximum operating frequency. However, if the supplemental sensory signals are provided at frequency above the cutoff frequency of the motion base controller, the process will continue despite the presence of an additional signal as indicated at block 86. The feedback signal required by the motion base controller will include the supplemental signal thereby insuring safe and stable operation of the motion base. Note the limits on the motion base controller remain. Therefore, the summed drive signals received by the actuator cannot produce a displacement that varies from the commanded displacement greater than a present value before the motion base controller declares a failure and shuts down motion base operation.

Similarly, although the invention has been shown and described with respect to a preferred embodiment thereof, it would be understood by those skilled in the art that other various changes, omissions and additions thereto maybe made without departing from the spirit and scope of the present invention. For example, although in the preferred embodiment only a single supplemental drive signal is provided to each of the actuators simultaneously, those skilled in the art will note that individual signals of varying magnitudes and phase can be provided should the application so require.

I claim:

1. A simulator system for use in providing an event simulation to occupants thereof, said simulator system comprising:

a motion base moveable along a plurality of displacement axes and having
   displaceable actuators for moving said motion base along said axes in accordance with received drive signals;
   feedback sensors configured with each of said actuators for providing signals indicative of the measured displacement of said corresponding actuator;
an audio-visual display means for providing a sequence of audio and visual images to the simulator system occupants;
a motion base controller receiving said feedback sensor signals for generating primary actuator drive signals below a cutoff frequency in response to received command signals;
a system controller for providing said command signals to said motion base controller in synchronization with the presentation of said audio-visual images and for providing auxiliary command signals;
a signal generator means independent of said motion base controller for generating supplemental actuator drive signals having a frequency above said cutoff frequency in response to said auxiliary command signals;
a drive signal summing apparatus serially configured with said motion base controller and said actuators for generating said actuator drive signals from a combination of said primary and said supplemental actuator drive signals.

2. The system of claim 1 wherein said motion base further comprises 4 displacement axes with three of said axes configured parallel to one another and perpendicular to a fourth one of said axes.

3. The system of claim 1 wherein said motion base controller further comprises a proportional-integral-derivative (PID) controller.

4. The system of claim 1 wherein said supplemental actuator drive signal generation means further comprises a digital audio tape (DAT) recorder.

5. The system of claim 1 wherein said supplemental actuator drive signals comprise a sequence of audio frequency signals.

6. The system of claim 1 wherein said audio-visual display image sequence is further recorded in a motion picture medium.

7. The system of claim 6 wherein said motion picture medium comprises a medium in "Omnimax" format.

8. The system of claim 1 wherein said supplemental actuator drive signals are of a frequency of between 2 and 250 Htz.

9. The system of claim 1 wherein said supplemental actuator drive signals are provided by a frequency generator.

10. The system of claim 9 wherein said supplemental actuator drive signals comprise a sequence of audio frequency signals corresponding to vibrations associated with a portion of the event being simulated.

11. The system of claim 1 wherein said drive signal summing apparatus further comprises a means for directly providing said supplemental actuator signals to said actuators.

12. The system of claim 1 wherein said summing apparatus provides approximately equal weighting to said primary and said supplemental actuator drive signals.

13. A method of generating an event simulation for occupants of a simulator including a motion base that is moveable along a plurality of displacement axes by means of displaceable actuators in accordance with received actuator drive signals and having feedback sensors configured with each of said actuators for providing signals indicative of the measured displacement of said corresponding actuator, said method comprising the steps of:
   generating an audio and video image sequence to be received by said occupants by means of an audio-visual display means;
   generating a sequence of primary actuator drive signals;
   synchronizing said primary actuator drive signals with said audio and visual image sequence;
   generating, in dependence on said audio and visual image sequence, supplemental actuator drive signals having a frequency in excess of said cutoff frequency;
   summing said primary actuator drive signals with said supplemental actuator drive signals to generate said actuator drive signals before presentation to said actuators.

14. A method of claim 13 wherein said motion base further comprises four displacement axes with three of said axes configured parallel to one another and perpendicular to a fourth one of said axes.

15. The method of claim 13 wherein said motion base controller further comprises a proportional-integral-derivative (PID) controller.

16. The method of claim 13 wherein said supplemental actuator drive signals comprise a sequence of audio frequency signals.

17. The method of claim 13 wherein said audio-visual display image sequence is further recorded in a motion picture medium.

18. The method of claim 17 wherein said motion picture medium comprises a medium in "Omnimax" type format.

19. The method of claim 13 wherein said supplemental actuator drive signals are of a frequency of between 2 and 250 Hz.

20. The method of claim 11 wherein said supplemental actuator drive signals are provided by a frequency generator.

21. The method of claim 20 wherein said supplemental actuator drive signals comprise a sequence of audio frequency signals corresponding to vibrations associated with a portion of the event being simulated.

22. The method of claim 13 wherein said summing step further comprises the step of directly providing said supplemental actuator signals to said actuators.

23. The method of claim 13 wherein said summing step further comprises the step of providing said primary and said supplemental actuator drive signals with approximately equal weight.

* * * * *